3,431,308
PROCESS FOR THE MANUFACTURE OF ETHERS OF POLYHYDRIC ALCOHOLS

Rolf Zimmermann, Wiesbaden-Biebrich, and Wolfgang Dathe, Wiesbaden, Germany, assignors to Chemische Werke Albert, Wiesbaden-Biebrich, Germany, a corporation of Germany
No Drawing. Filed Aug. 14, 1963, Ser. No. 301,992
Claims priority, application Germany, Aug. 24, 1962, C 27,785; Dec. 22, 1962, C 28,748
U.S. Cl. 260—615            17 Claims
Int. Cl. C07c *41/10, 43/04*

This invention is concerned with a process for the manufacture of ethers of polyhydric alcohols and products comprising said ethers.

It has been proposed to produce allyl ethers of polyhydric alcohols, according to the Williamson synthesis, by reacting a polyhydric alcohol, for example pentaerythritol, with allyl bromide in an excess of 50% aqueous sodium hydroxide at elevated temperatures. Ether mixtures having a varying content of allyl ether groups are thus obtained in unsatisfactory yields. Moreover reaction periods of more than 20 hours are necessary.

Recently a process has been proposed according to which mono-hydroxyl polyethers are produced by the reaction of polyhydric alcohols with alkenyl halides in the presence of caustic soda. In this process polyhydroxy ethers, which may be obtained according to the Williamson synthesis, are used as solvents. In this case also, however, the formation of the ethers only occurs after some hours. It is an object of the present invention to provide an improved process for the manufacture of ethers of polyhydric alcohols.

According to the present invention there is provided a process for the manufacture of ethers of polyhydric alcohols, which ethers may contain free hydroxyl groups, wherein a polyhydric alcohol is reacted with a hydrocarbon halide, in which a halogen is preferably bound directly to an aliphatic carbon atom, in the presence of an amount of an alkali metal hydroxide which is at least equivalent to the amount of the hydrocarbon halide used, and in the presence of dimethylsulfoxide as a solvent at a temperature of up to the boiling point of dimethylsulfoxide, generally at 50 to 180° C., and preferably at 95 to 140° C.

Due to its high dipole moment, dimethylsulfoxide is a very good solvent both for polyhydric alcohols and for hydrocarbon halides. Moreover the ethers formed also dissolve readily in dimethylsulfoxide. A further advantage, which is inherent in the use of this solvent, lies in the fact that alkali metal hydroxides can be finely and permanently suspended in dimethylsulfoxide thus favoring the formation of an alcoholate between the polyhydric alcohol and the alkali metal hydroxide. Hence reaction between the hydrocarbon halide and the alkali metal alcoholate proceeds rapidly and a good yield of ether is obtained. Apart from this hydrolysis of the halide and the resulting formation of ethers from 2 mols of the halide is materially suppressed. A further advantage lies in the high boiling point of dimethylsulfoxide so that it is not necessary to carry out the process under pressure as is the case when low-boiling solvents are used. However, in the process of the present invention elevated pressure may be used.

If the dimethylsulfoxide solvent is reused several times in the process of the invention water formed during the reaction accumulates therein. Hence the yield of the ethers of polyhydric alcohols is reduced unless the dimethylsulfoxide is dried and distilled several times before it is reused. This disadvantage may be overcome by adding to the dimethylsulfoxide one or more entrainers which have a boiling point lower than dimethylsulfoxide, or any azeotrope containing it, so that the water formed during the reaction may conveniently be azeotropically distilled off. Generally the entrainer is used in an amount of from 0.5 to 2 mols, preferably from 1 to 1.5 mols, per mol of polyhydric alcohol used.

The use of an entrainer materially simplifies the process of the invention inasmuch as the dimethylsulfoxide used remains dry and may be reused as often as desired without being separately dried and subjected to fractional distillation. Also the yield of ethers obtained and particularly the proportion of higher ethers obtained is increased by this use of an entrainer particularly if the polyhydric alcohol is reacted with a relatively small e.g. an equimolecular amount of a hydrocarbon halide. This is evident from the following comparison:

1 mol of allyl chloride was reacted with 1 mol of trimethylolpropane using dimethylsulfoxide as a solvent and there was obtained 90 g. of a mixture of ethers consisting of 64% by weight of trimethylolpropanemonoallyl ether and 36% by weight of trimethylolpropanediallyl ether, i.e. 63% of the theoretical yield calculated on the amount of allyl chloride used. When under similar conditions but in addition 1.5 mols of toluene was used in the reaction medium as an entrainer and the water formed during the reaction was removed by an azeotropic distillation, the yield of the ethers formed is increased to 132 g., i.e. 97.5% of the theoretical yield. The mixture consisted of 55.5% of trimethylolpropanemonoallyl ether and 44.5% of trimethylolpropanediallyl ether.

The amount of the halide used will differ depending on whether the alcohol is to be completely or partially etherified, i.e. whether the ether produced is to contain free alcoholic hydroxyl groups. The amount of dimethylsulfoxide used is generally between 0.5 to 2 mols for every mol of polyhydric alcohol. Preferably 0.75 to 1.5 mols are used. In certain cases, a larger or smaller amount may also be used. It is advisable to ensure that the reactants are intimately mixed for example, by vigorous stirring during the reaction. In some instances it may be necessary to cool the reaction vessel. Generally when using an entrainer the hydrocarbon halide is added as soon as the water produced as a result of the formation of the alcoholate azeotropically distills over. The halide is then added at such a rate that the temperature in the reaction vessel does not fall below the boiling point of the azeotrope. When all the hydrocarbon halide has been added to the reaction mixture heating is continued until no more water comes off.

When no entrainer is used the hydrocarbon halide may conveniently be added to the reaction mixture at such a rate that gentle refluxing of the reaction mixture is maintained. After the addition of all the hydrocarbon halide, the reaction mixture is usually maintained at the reaction temperature for some time, for example for ½ hour.

On cooling down the reaction mixture on completion of the process an alkali halide precipitates and is separated, for example by filtration under reduced pressure, and the entrainer and the water are distilled off, for example at a pressure of about 100 mm. of mercury. The dimethylsulfoxide may conveniently be recovered by distillation at 12 to 15 mm. of mercury. The residue of the distillation consists of a mixture of ethers, the composition of which may be determined from the OH-values or from the refractive indices by using a graphic interpolation method. If desired, the pure ethers may be obtained by a fractional distillation in vacuo. The recovered dimethylsulfoxide and the entrainer may be subsequently reused in the process.

The polyhydric alcohols used in this invention may for example be glycerol, trimethylolalkanes such as trimethylolethane or trimethylolpropane, pentaerythritol, dipentaerythritol, butanetriol - 1,2,4; hexanetriol - 1,2,5; hexanetriol - 1,2,6, mannitol, sorbitol, 2,2,4 - trimethlolpentanol; 2,5 - dimethylolhexanediol - 1,6; hexaneterol-1,3,4,6; 3,3,3-trimethylolpropane - ol - 2; 1,1-dimethylolbutanol-3; 3,3-dimethylolbutane - ol - 2; 2,2,2-trimethylol-1-phenylethanol (which may be made from formaldehyde and acetophenone), 2,2,6,6-tetramethylol-cyclopentanol-1; 2,2,6,6-tetramethylol-cyclohexanone-1.

Suitable hydrocarbon halides, in which the halogen is bound to an aliphatic carbon atom are alkyl, alkenyl, cycloalkyl and aralkyl halides in which the halogen is sufficiently reactive. Suitable compounds are for example the chlorides, bromides and iodides of the following radicals: ethyl, propyl, n-butyl, iso-butyl, tert.-butyl, a pentyl, a hexyl, allyl, α-methallyl, β-methallyl, crotyl, a pentenyl and a hexenyl. Other suitabe hydrocarbon halides are the iodides, bromides and chlorides of the following radicals: benzyl, α-phenylethyl, β-phenylethyl and diphenylmethyl. These radicals may of course be cyclic where possible such as in the case of the cyclopentyl, cyclohexyl, cyclopntenyl and clohexenyl radicals. The present process is particularly important for the manufacture of alkenyl ethers such as allyl ethers.

The alkali metal hydroxides used will usually be the inexpensive hydroxides of sodium and potassium. However the hydroxides of the other alkali metals may alternatively be used.

As the entrainer there may be used for example, benzene, toluene, xylene, aliphatic hydrocarbons such as n-hexane, heptanes, octanes or nonanes, cyclohexane or homologues, or fractions of hydrocarbons which boil above 65° C., preferably between 90 and 130° C. Compounds other than hydrocarbons such as chlorobenzene may also be used, particularly those compounds which may easily be separated from the reaction products. It is important that the entrainers should not react with any one of the reactants.

The ethers obtained are important intermediates, for example in the manufacture of unsaturated polyesters which dry tack-free when exposed to the air, and for the manufacture of resins therefrom. These ethers may also be used as relatively high boiling solvents or as plasticizers, particularly for polymerised compositions.

Where the context so admits, any reference to the use of a single compound in this specification is to be construed as including the use of mixtures of compounds; thus for example, a mixture of alcohols or of hydrocarbon halides may be used, resulting in the formation of mixed ethers. Mixed ethers may also be produced by the reaction of alcohols with two or more hydrocarbon halides, for example in consecutive stages.

In order that the invention may be well understood the following examples are given by way of illustration only:

EXAMPLE 1

134 g. of trimethylolpropane (1 mol), 48 g. of caustic soda (1.2 mols) and 75 g. of dimethylsulfoxide are introduced into a 500 ml. three neck flask which is provided with a stirrer, a thermometer, a dropping funnel and an efficent condenser. This mixture is heated to 110 to 115° C. while stirring vigorously and 92 g. of allyl chloride (1.2 mols) are added dropwise thereto. After a short time the temperature rises to 120 to 125° C. The heating source is removed and the temperature is kept, if necessary by cooling the reaction vessel, between 115 and 125° C. The influx rate of the allyl chloride is adjusted so that only a gentle refluxing occurs. After 10 to 15 minutes the addition of allyl chloride is completed. The temperature is maintained for about ½ hour at a temperature of 110 to 120° C. After cooling the reaction mixture the precipitated common salt is separated, washed with dimethylsulfoxide or another easily volatilisable organic solvent such as acetone, and the filtrate is worked up by distillation. First the water formed is distilled off at a pressure of about 100 mm. of mercury. Thereafter the dimethylsulfoxide is recovered by distillation at 12 to 15 mm. of mercury. 130 g. of a mixture of from 55% of trimethylolpropanemono - and 45% of trimethlolpropanediallyl ether are obtained from the residue by a further fractionation at 0.5 mm. of mercury.

Boiling point $_{0.5}$=90 to 115° C., OH-value 470 to 480. Yield: 82% of the theory, calculated on allyl chloride.

EXAMPLE 2

134 g. of trimethylolpropane (1 mol), 120 g. of caustic soda (3 mols) and 75 g. of dimethylsulfoxide are introduced into the apparatus described in Example 1. This mixture is heated to 115 to 125° C. 229 g. of allyl chloride (3 mols) are then added, while stirring vigorously so that no refluxing occurs at the beginning of the reaction and a relatively gentle refluxing occurs at the end of the reaction. After about 25 minutes the addition of ally chloride is completed. Thereafter the reaction mixture is heated for a further ½ hour with stirring to 115 to 120° C. The mixture is worked up as is described in Example 1. The yield is 206 g. of a mixture of 75% of trimethylolpropanediallyl ether and 25% of trimethylolpropanetriallyl ether.

Boiling point $_{0.5}$=93 to 100° C. OH-value 180 to 200. Yield: 93% of the theory, calculated on trimethylolpropane.

EXAMPLE 3

134 g. of trimethylolpropane (1 mol), 48 g. of caustic soda (1.2 mols) and 75 g. of dimethylsulfoxide are heated to 115° C., while stirring vigorously. Then 111 g. of n-butyl chloride (1.2 mols) are added dropwise at 115 to 125° C. and the mixture is heated for a further ½ hour to 110 to 115° C. The mixture is worked up as is described in Example 1. The yield is 118 g. of a mixture of 51% of trimethylolpropanemonobutyl ether and 49% of trimethylolpropanedibutyl ether.

Boiling point $_{0.5}$=108 to 122° C. OH-value 400. Yield: 77% of the theory, calculated on n-butyl chloride.

EXAMPLE 4

A mixture of 134 g. of hexanetriol-1,2,5 (1 mol), 52 g. of caustic soda (1.3 mols) and 70 g. of dimethylsulfoxide is heated to 90 to 100° C. in the apparatus described in Example 1, while stirring vigorously. At this temperature the mixture is treated with 100 g. (1.3 mols) of allyl chloride. The mixture is worked up as is described in Example 1. The yield is 112 g. of a mixture of 32.5% of hexanetriolmonoallyl ether and 67.5% of hexanetrioldiallyl ether.

Boiling point $_{0.5}$=85 to 115° C. OH-value 380 to 387. The yield is 75% of the theory, calculated on allyl chloride.

EXAMPLE 5

136 g. of pentaerythritol (1 mol), 80 g. of caustic soda (2 mols) and 100 g. of dimethylsulfoxide are slowly heated with vigorous stirring to 120° C. in the apparatus described in Example 1. 153 g. of allyl chloride (2 mols) are then added dropwise at 120 to 130° C. over 15 to 20 minutes. During the addition of allyl chloride the reaction vessel is cooled. The temperature is maintained for another ½ hour. Thereafter the precipitated common salt is separated from the reaction mixture and washed with acetone. The clear filtrate is fractionated in vacuo as described above. The following fractions are obtained:

(1) Boiling point $_{0.5}$=110 to 115° C.=15.5 g., OH-value 260.
(2) Boiling point $_{0.5}$=116 to 130° C.=91 g., OH-value 356.
(3) Boiling point $_{0.5}$=130 to 150° C.=45 g., OH-value 633.

151.5 g. of a mixture of 8% of pentaerythritolmonoallyl ether, 52% of pentaerythritoldiallyl ether and 40% of pentaerythritoltriallyl ether are obtained. The yield is 76%, calculated on the allyl chloride used.

EXAMPLE 6

306 g. of allyl chloride (4 mols) are added at 120 to 130° C. to 136 g. of pentaerythritol (1 mol), 160 g. of caustic soda (4 mols) and 160 g. of dimethylsulfoxide over 30 minutes as described in Example 5, and the reaction product is further heated as described in Example 1. By a fractional distillation the following fractions are obtained:

(1) Boiling point $_{0.5}$=112 to 115° C.=100 g., OH-value 158.
(2) Boiling point $_{0.5}$=116 to 130° C.=37 g., OH-value 234.

The ether mixture formed during the reaction contains 1% of pentaerythritoldiallyl ether, 76% of pentaerythritoltriallyl ether, and 23% of pentaerythritholtetraallyl ether.

Yield.—90% of the theory, calculated on the pentaerythritol used. 72% of the theory, calculated on the allyl chloride used.

EXAMPLE 7

134 g. of trimethylolpropane (1 mol), 76 g. of caustic soda (1.9 mols) and 70 g. of dimethylsulfoxide are heated under stirring in the apparatus described in Example 1 to 115 to 120° C. and 236 g. of benzyl chloride (1.9 mols) are added dropwise to the mixture over 15 to 20 minutes between 120 and 130° C. with occasional cooling. Thereafter the mixture is further stirred for ½ to 1 hour at 120° C. After separating the precipitated common salt, the dimethylsulfoxide and remaining portions of unreacted benzylchloride which may be present are recovered at 12 to 15 mm. of mercury. The distillation at 0.5 to 1 mm. of mercury yields a fraction having a boiling point of 195 to 207° C. and an OH-value of 161. The trimethylolpropanebenzyl ether obtained (201 g.) consists of 92% of trimethylolpropanedibenzyl ether and 8% of trimethylolpropanetribenzyl ether.

Yield.—70% of the theory, calculated on the benzyl chloride used.

EXAMPLE 8

218 g. of 2,2,6,6-tetramethylol-cyclohexanone-1 (1 mol), 140 g. of caustic soda (3.5 mols) and 200 g. of dimethylsulfoxide are heated with stirring in the apparatus described in Example 1 to 110° C. and 268 g. of allyl chloride (3.5 mols) are added dropwise thereto over 20 to 25 minutes at a temperature between 110 and 120° C. The strong initial reflux soon abates and finally completely disappears. The reaction mixture is stirred for a further ½ hour to 1 hour at 120° C. and is then worked up as described in Example 7. The residue obtained after distilling off the dimethylsulfoxide at 12 to 15 mm. of mercury is distilled at 0.5 mm. of mercury. The main portion distills between 163 and 185° C. (285 grams). The slightly yellowish distillate has a hydroxyl value of 213 and therefore consists of 83% of 2,2,6,6-tetramethylolcyclohexanone-1-triallyl ether and 77% of the tetraallyl ether.

Yield.—83% of the theory, calculated on the alcohol used.

EXAMPLE 9

670 g. of trimethylolpropane (5 mols), 500 g. of solid caustic soda (12.5 mols) and 1050 g. of a mixture of toluene and dimethylsulfoxide (proportion by weight 2:1) are introduced into a 4 litre four neck flask which is provided with a stirrer, a dropping funnel, a thermometer, a water separator and an efficient condenser. This mixture is heated with vigorous stirring, up to the boiling point of the toluene. Immediately a part of the water formed by the formation of the alcoholate is azeotropically distilled off together with the toluene, and is removed by the water separator. At the same time 956 g. of allyl chloride (12.5 mols) are added thereto. The allyl chloride is dropped in at such a rate that the temperature in the reaction flask does not fall below 105° C. After the addition of the allyl chloride is completed, the reaction mixture is kept under reflux until no more water is distilled off. Then the reaction mixture is cooled down and the precipitated common salt is filtered off and washed with toluene. The filtrates are combined and fractionated in vacuo. At first the toluene distills off at about 100 mm. of mercury and then the dimethylsulfoxide (boiling point 79° C./15 mm.) at about 15 mm. of mercury. The residue is distilled at 0.5 mm. of mercury between 85 and 95° C.

The ether mixture obtained has an OH-value of 205 and is a mixture of 85 percent by weight of trimethylolpropanediallyl ether and 15 percent by weight of trimethylolpropanetriallyl ether. The yield is 1070 g., that is 98% of the theory, calculated on the trimethylolpropane used.

EXAMPLE 10

954 g. of pentaerythritol (7 mols), 765 g. of caustic soda (19.3 mols) and 2200 g. of a mixture of equal parts by weight of dimethylsulfoxide and toluene are heated to 110° C. As soon as refluxing commences, the dropwise addition of 1478 g. (19.3 mols) of allyl chloride is begun. The dropping rate is adjusted so that the temperature in the reaction flask does not exceed 105° C. After all of the allyl chloride has been added, the reaction mixture is heated under reflux until no more water azeotropically distills over with the toluene. The working up is carried out as described in Example 9. The following fractions are obtained:

1402 g., boiling point: 110–125° C./0.5 mm. of mercury; OH-value 294.
47 g., boiling point: 130–150° C./0.5 mm. of mercury; OH-value 663.

1449 grams of pentaerythritolallyl esters consisting of a mixture of 1% of pentaerythritolmonoallyl ether, 27.3% of pentaerythritoldiallyl ether and 71.7% of pentaerythritoltriallyl ether is obtained.

The total yield is 85.2% of the theory, calculated on the pentaerythritol used and 82.2% calculated on the allyl chloride used.

EXAMPLE 11

134 g. of 1,1-dimethylolbutane-ol-3 (1 mol), 100 g. of caustic soda (2.5 mols), 210 g. of a mixture of dimethylsulfoxide and toluene (weight ratio 1:2) and 191.5 g. of allyl chloride (2.5 mols) are reacted as described in Examples 9 and 10 and the reaction product is worked up in a similar manner. The yield is 170.2 g. of an ether mixture, which distills at 97 to 110° C./1.5 mm. of mercury and has an OH-value of 227. The mixture consists of 86% of 1,1-dimethylolbutane-ol-(3)-diallyl ether and 14% of 1,1-dimethylolbutane-ol-(3)-triallyl ether. The yield is 78% of the theory, calculated on the 1,1-dimethylolbutane-ol-3 used.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A process for the manufacture of ethers of polyhydric alcohols which comprises reacting a polyhydric alcohol in which the alcoholic hydroxy groups are the sole functional groups and which is free from aliphatic unsaturation with a hydrocarbon mono-halide free from acetylenic unsaturation, in which a halogen of an atomic weight of at least 35 is bound directly to a saturated aliphatic carbon atom in the presence of an amount of an alkali metal hydroxide which is at least equivalent to the amount of the hydrocarbon halide, and in the presence of dimethylsulfoxide as a solvent and an entrainer which is inert towards the reactants, which forms an azeotrope with water and has a boiling point lower than dimethylsulfoxide and any azeotrope containing the latter and removing the water formed during the reaction from the reaction mixture by an azeotropic distillation, the reaction being carried out at a temperature up to the boiling point of dimethylsulfoxide.

2. A process as claimed in claim 1 wherein the reaction is carried out at a temperature of from 50 to 180° C.

3. A process as claimed in claim 1 wherein the amount of dimethylsulfoxide is in the range from 0.5 to 2 mols for every mol of polyhydric alcohol.

4. A process as claimed in claim 1 wherein the hydrocarbon halide is a monohalide.

5. A process as claimed in claim 1, wherein the hydrocarbon halide is an alkenyl halide.

6. A process as claimed in claim 1, wherein the hydrotrainer has a boiling point above 65° C.

7. A process as claimed in claim 1, wherein the entrainer has a boiling point from 90 to 130° C.

8. A process as claimed in claim 1, wherein the entrainer is a hydrocarbon.

9. A process as claimed in claim 1, wherein the entrainer is used in an amount of from 0.5 to 2 mols per mol of polyhydric alcohol used.

10. A process as claimed in claim 9, wherein the entrainer is applied in an amount of from 1 to 1.5 mols per mol of polyhydric alcohol used.

11. A process for the manufacture of ethers of polyhydric alcohols which comprises reacting a polyhydric alcohol in which the alcoholic hydroxy groups are the sole functional groups and which is free from aliphatic unsaturation with an alkenylmono-halide in which the halogen is bound directly to a non-olefinic aliphatic carbon atom in the presence of an amount of an alkali metal hydroxide which is at least equivalent to the amount of the alkenyl halide and in the presence of from 0.5 to 2 mols, referred to every mol of polyhydric alcohol, of dimethylsulfoxide as a solvent and an added hydrocarbon acting as an entrainer for water and having a boiling point from 65 to 130° C., and removing the water formed during the reaction from the reaction mixture by an azeotropic distillation, the reaction being carried out at a temperature of from 95 to 140° C.

12. A process as claimed in claim 11, wherein the alkenyl-mono-halide is allyl chloride.

13. A process as claimed in claim 11, wherein the halide is selected from the group consisting of a chloride and bromide.

14. A process as claimed in claim 11, wherein the ethers still contain free alcoholic hydroxy groups.

15. A process as claimed in claim 11 wherein the reaction is carried out at a temperature of from 95 to 140° C.

16. A process as claimed in claim 11 wherein the amount of dimethylsulfoxide is in the range from 0.75 to 1.5 mols for every mol of polyhydric alcohol.

17. A process for the manufacture of ethers of pentaerythritol which comprises reacting pentaerythritol with an amount of allyl halide sufficient to etherify all the pentaerythritol hydroxy groups, the halogen being selected from the group consisting of chlorine, bromine and iodine, in the presence of an amount of alkali metal hydroxide which is equivalent to the amount of allyl halide employed, and in the presence of dimethylsulfoxide as a solvent, water being removed as formed during the reaction by azeotropic distillation.

References Cited

UNITED STATES PATENTS 2,042,219  5/1936  Groll et al.
3,048,577  8/1962  Gaertner.

OTHER REFERENCES

Tommila et al., "Chem. Abst.," vol. 56, col. 13590H (1962).

Watanabe et al., "J. Org. Chem.," vol. 23, pp. 1666–8 (1958).

LEON ZITVAR, *Primary Examiner.*

HOWARD T. MARS, *Assistant Examiner.*

U.S. Cl. X.R.

260—586, 611